(12) United States Patent
Cannon et al.

(10) Patent No.: US 6,510,207 B1
(45) Date of Patent: Jan. 21, 2003

(54) VOICE MESSAGING SYSTEM STORAGE OF EMERGENCY ALERT SYSTEM WARNINGS

(75) Inventors: Joseph M. Cannon, Harleysville, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/340,667

(22) Filed: Jun. 29, 1999

(51) Int. Cl.[7] ............................................. H04M 1/64
(52) U.S. Cl. ..................... 379/68; 379/48; 379/67.1; 379/37; 379/46; 379/51; 379/72
(58) Field of Search ..................... 379/48, 67.1, 88.12, 379/196, 215.01, 354, 38, 37, 39, 40, 41, 42, 43, 44, 45, 47, 51, 68

(56) References Cited

U.S. PATENT DOCUMENTS

| | | | | |
|---|---|---|---|---|
| 4,508,937 A | * | 4/1985 | Burger et al. | 379/373.02 |
| 5,526,424 A | * | 6/1996 | Karnowski | 379/354 |
| 5,687,220 A | * | 11/1997 | Finnigan | 379/196 |
| 5,917,887 A | * | 6/1999 | Fesler et al. | 379/48 |
| 6,292,543 B1 | * | 9/2001 | Cannon et al. | 379/102.01 |
| 6,304,636 B1 | * | 10/2001 | Goldberg et al. | 379/215.01 |
| 6,351,522 B1 | * | 2/2002 | Vitikainen | 379/67.1 |
| 6,353,659 B1 | * | 3/2002 | Van Ryzin et al. | 379/88.12 |

* cited by examiner

Primary Examiner—Fan Tsang
Assistant Examiner—Gerald Gauthier
(74) Attorney, Agent, or Firm—William H. Bollman

(57) ABSTRACT

Apparatus and method to receive and record an Emergency Alert System warning message on a voice messaging system. A voice messaging system such as a telephone answering device includes an Emergency Alert System radio receiver and detector module to receive and record an Emergency Alert System warning message. The emergency message can be reviewed either locally or remotely. In another embodiment, an Emergency Alert System warning message is received by a telephone system, and played in the earpiece or speaker on a substantially real-time basis. In yet another embodiment, an Emergency Alert System warning message may be recorded and then forwarded to another location based on address information (e.g., telephone number, e-mail address, pager number, etc.) which would not otherwise be within the broadcast area of the original Emergency Alert System warning message.

18 Claims, 5 Drawing Sheets

VOICE MESSAGING SYSTEM STORAGE OF EMERGENCY ALERT SYSTEM WARNINGS

BACKGROUND OF THE INVENTION

1. Field of the Invention

This invention relates generally to a voice messaging system. More particularly, it relates to a voice messaging system such as a telephone answering device which receives and records broadcasted emergency alert system warnings.

2. Background of Related Art

Voice messaging systems (e.g., telephone answering devices (TADs)) are useful devices for both the home and office. Larger voice messaging systems in general work in conjunction with a private branch exchange (PBX) unit to provide voice mailboxes for a large number of users. Smaller voice messaging systems, e.g., telephone answering devices typically operate on a single telephone line and answer an incoming call to an unused (i.e., on-hook) telephone after a predetermined number of rings.

Voice messaging systems and telephone answering devices cause a telephone line to enter an off-hook condition, then play an outgoing message to the caller. After the outgoing message is completed, the caller is allowed to record a voice message on the voice messaging system, e.g., telephone answering device. At a later time, the voice message is replayed by the user, either local to the telephone answering device or via remote connection from another telephone through the public switched telephone network (PSTN).

In order to alert as many people as possible to impending hazards or dangers, the Emergency Alert System (formerly the Emergency Broadcast System) was created. The Emergency Alert System provides messages to persons within particular areas. The messages typically contain important information about an imminent threat to life or property. Examples of such messages include, but are not limited to, 911 system failures, tornado and other severe weather warnings, hazardous material incidents, and evacuation orders.

Emergency alert messages are broadcast by AM radio stations, FM radio stations, and broadcast television stations, as well as by most cable television stations. The Emergency Alert System is specifically designed to be received by automated equipment that would store or rebroadcast warning messages without the need for human intervention. This automation is especially helpful for the stations that broadcast the messages. Unfortunately, while the Emergency Alert System warnings are useful and beneficial to those individuals which happen to have tuned in their radios or televisions in at the time of the message broadcast, those individuals who do not have a television (TV) or radio turned on will not receive the important message, thereby increasing the risk of harm for those individuals.

Accordingly, there exists a need for an improved Emergency Alert System warning device which will reduce the risk of harm to individuals who do not have a radio or TV turned on when an emergency alert message is transmitted by an appropriate broadcast station.

SUMMARY OF THE INVENTION

In accordance with the principles of the present invention, a telephone system comprises an audio recorder playback module. An emergency broadcast radio receiver and detector module is in communication with the audio recorded playback module. The audio recorder playback module is adapted to record an emergency message received by the emergency broadcast radio receiver.

In accordance with another aspect of the present invention, a telephone system comprises a telephone handset, an emergency broadcast radio receiver and detector module in communication with the audio recorded playback module, and a ring detect circuit. The emergency broadcast radio receiver and detector module is adapted to activate the ring detect circuit upon receipt of a broadcast emergency message, and the telephone handset is adapted to play the emergency message received by the emergency broadcast radio receiver.

A method for receiving and recording a broadcast emergency message in accordance with another aspect of the present invention comprises receiving an emergency message in a voice messaging system, and recording the emergency message in voice message memory of the voice messaging system for later retrieval and playback by a user.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
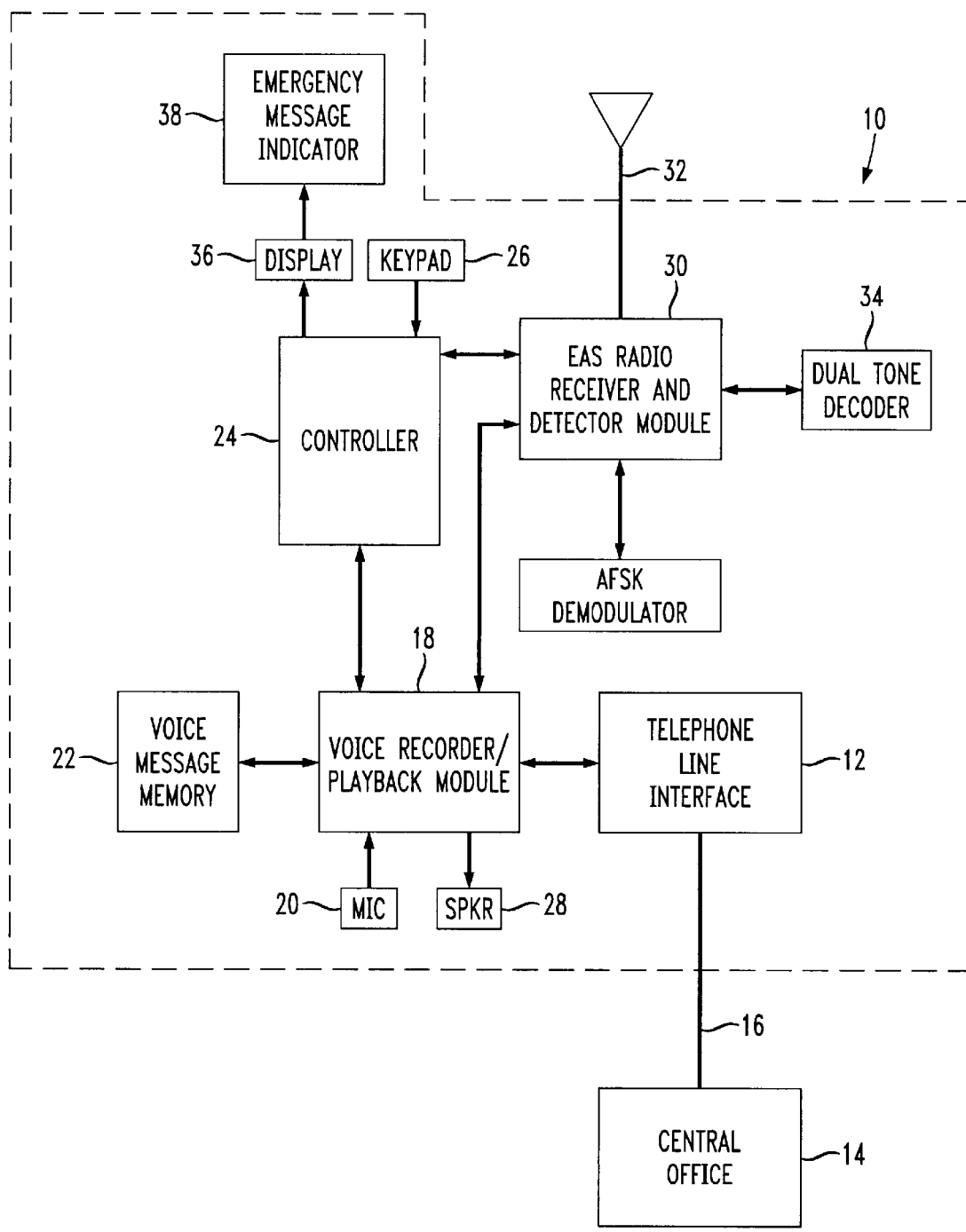
FIG. 1 illustrates an exemplary embodiment of a voice messaging system, e.g., a telephone answering device which receives and records Emergency Alert System warnings, in accordance with the principles of the present invention.

The present invention provides a telephone answering device and method for receiving and recording Emergency Alert System warnings. The telephone answering device in accordance with one aspect of the present invention includes a radio receiver and an Emergency detector and decoder. An Emergency Alert system warning message is detected and decoded, and the audio portion of the warning is recorded as a voice message on the telephone answering device. In other embodiments, the audio portion of the Emergency Alert system warning message may be played from the receiver or speaker of an otherwise ordinary telephone not including a voice messaging system.

The invention may also be practiced in non-voice messaging devices. For instance, in such a non-voice messaging device, when an Emergency Alert System warning is received it may initiate an emulated telephone call with a ring signal to the ringer of the telephone answering device.

Then, when the telephone device is answered, the audio portion of the Emergency Alert System warning message may be played to the listener through the handset as if it was a telephone call. In such an embodiment, it may be desired to include a small portion of audio memory to buffer the Emergency Alert System warning message to compensate for the portion of the Emergency Alert System warning message which is lost to the amount of time it takes the listener to answer the emulated telephone call.

On the other hand, a telephone answering device in accordance with the principles of the present invention may or may not create an emulated telephone call, tying up the telephone line during receipt of the Emergency Alert System warning message. Thus, ordinary telephone calls over the telephone line may or may not be disallowed while the Emergency Alert System warning message is recorded. The simplest way to prevent incoming telephone calls from interrupting the recording of an Emergency Alert System warning message is to place the telephone line in an off-hook condition while the Emergency Alert System warning message is being recorded, but separate processing and recording of the Emergency Alert System warning message may allow simultaneous operation of the telephone answering device.

The audio portion of the Emergency Alert System warning is recorded as if it were a voice message, and stored in voice message memory via a voice recorder/playback module. Once the Emergency Alert System audio portion of the warning message is received at least once, the telephone answering device stops recording, and the telephone answering device goes back on-hook both with respect to the radio receiver and with respect to the telephone line. Thereafter, the user can retrieve the recorded Emergency Alert System warning message either locally or remotely, together with any voice messages.

The telephone answering device may prioritize for early playback any recorded Emergency Alert System warning message before regular voice messages. Alternatively, or additionally, the telephone answering device may include a visual indicator such as an LED or similar device which is activated or lit when the telephone answering device has a new (i.e., not-yet-played-back) Emergency Alert System warning message.

Although the present invention is shown embodied in a telephone answering device and/or a telephone, the present invention is equally applicable to voice messaging systems in general.

FIG. 1 illustrates an exemplary telephone answering device, indicated generally at 10, capable of receiving and recording an Emergency Alert System warning message, in accordance with the principles of the present invention.

In the embodiment of FIG. 1, the telephone answering device 10 includes at least one telephone line interface 12 for interconnection with a telephone company central office 14 via a telephone line 16. The telephone line interface 12 interconnects the voice recorder/playback module 18 with the telephone line 16, e.g., for use with remote access to the Emergency Alert System warning messages.

The Emergency Alert System warning messages are detected and decoded in an Emergency Alert System radio receiver and detector module 30 having an antenna 32, and is connected or is otherwise in communication with a controller 24. The Emergency Alert System radio receiver and detector module 30 detects, receives, and decodes Emergency Alert System warning messages in the otherwise known fashion.

The controller 24 controls the overall functions of the telephone answering device 10. The controller 24 may be any suitable processor, e.g. a microprocessor, a digital signal processor (DSP), or a microcontroller.

A keypad 26 allows the user to select various modes of operation, including the playback of voice messages, e.g., a recorded Emergency Alert System warning message, through a speaker 28 connected to the voice recorder/playback module 18.

The Emergency Alert System radio receiver and detector module 30 can either be integrated within the telephone answering device 10, as illustrated in FIG. 1, or can be external to the telephone answering device 10 and interfaced through an appropriate serial or parallel interface on the Emergency Alert System radio receiver and detector module 30 and the telephone answering device 10.

A dual tone decoder 34 in communication with the Emergency Alert System radio receiver and detector module 30 may be provided to decode the 853 Hertz and 960 Hertz dual tone signal indicating an Emergency Alert System broadcast. The dual tone decoder 34 may be the same as that otherwise included in conventional telephone answering devices.

A display 36 can be connected to the controller 24 to display various information relating to the otherwise conventional operation of the telephone answering device 10 as well as the status of any received and recorded Emergency Alert System warning messages. To this end, the display 36 preferably includes an emergency message indicator 38 to indicate to the user that an Emergency Alert System warning message has been recorded. This allows the user to quickly ascertain whether a warning message has been recorded, provoking their immediate review of the warning message. Additional indicators may be provided to indicate the availability (i.e., detection) of Emergency Alert System warning message information without being recorded.

Figure 2A:
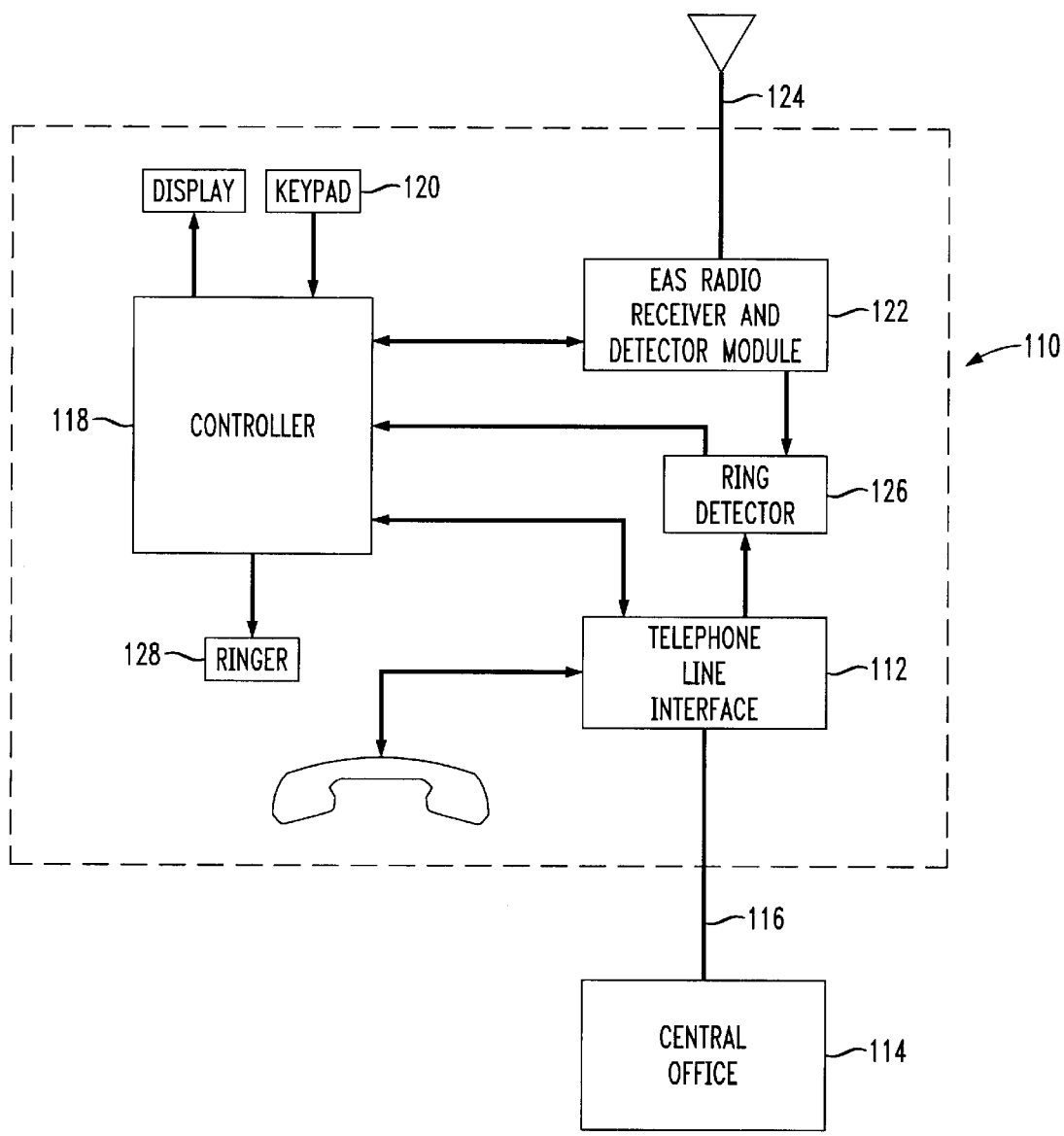
FIG. 2A illustrates another embodiment of a telephone system which receives Emergency Alert System warnings and audibly plays the warnings, in accordance with the principles of the present invention.
Figure 2B:
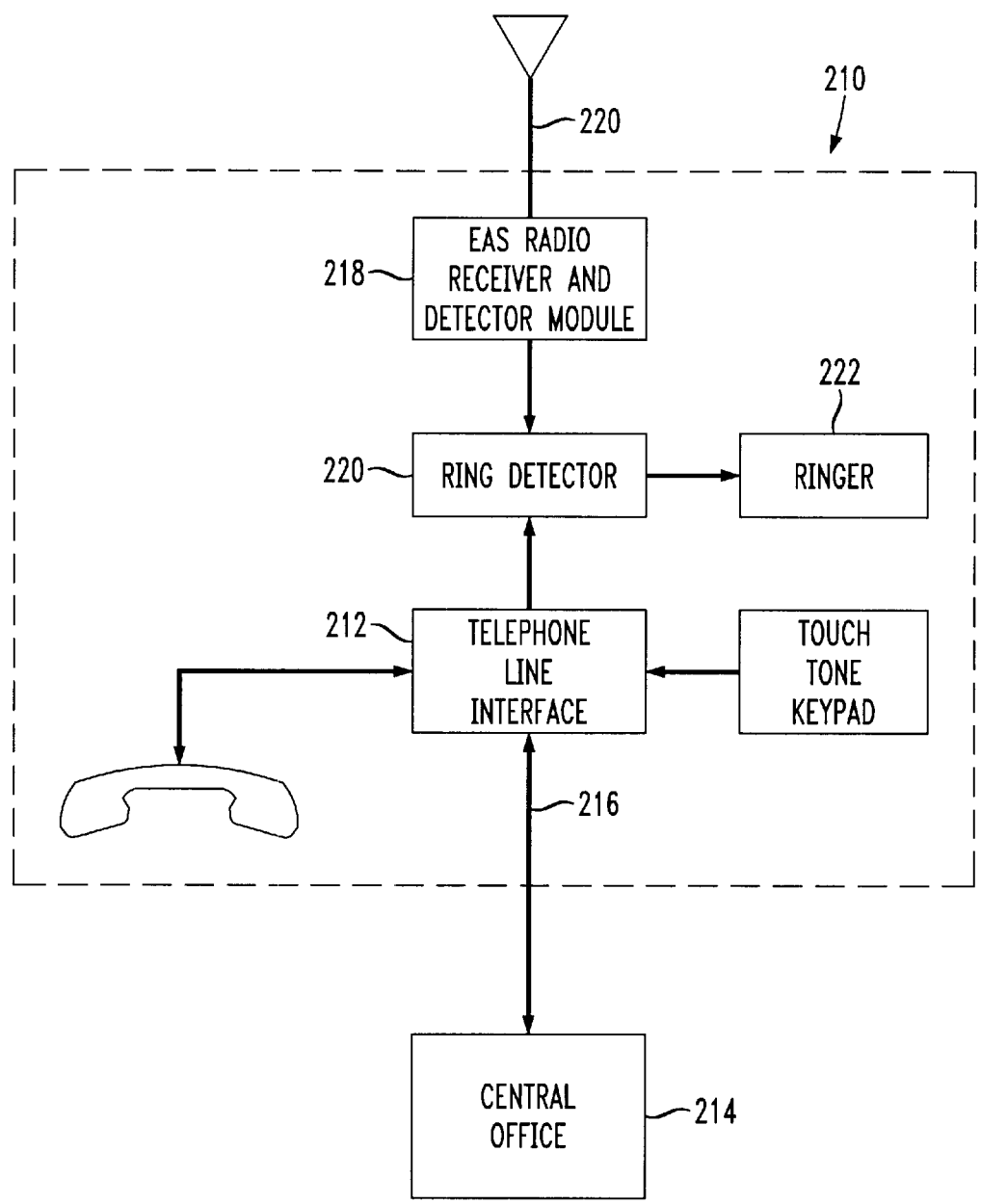
FIG. 2 illustrates an embodiment of a telephone system which receives Emergency Alert System warnings and audibly plays the warnings, in accordance with the principles of the present invention.

FIG. 2 shows a telephone system 110 capable of audibly playing an Emergency Alert System warning message in real time, i.e., as it is received.

In particular, the telephone system 110 shown in FIG. 2 includes at least one telephone line interface 112 for interconnection with a telephone company central office 114 via a telephone line 116. The telephone system 110 is under the control of a controller 118. The controller 118 controls the functions of the telephone system 110 and may be any suitable processor, e.g. a microprocessor, a digital signal processor (DSP), or a microcontroller.

A keypad 120 allows a user to select any of a variety of modes of operation, including the dialing of an outgoing telephone number.

The telephone system 210 includes at least one telephone line interface 212 for interconnection with a telephone company central office 214 via a telephone line 216.

The telephone system 110 illustrated in FIG. 2 further includes an Emergency Alert System radio receiver and detector module 122 having an antenna 124. The Emergency Alert System radio receiver and detector module 122 can either be integrated within the telephone system 110, as illustrated in FIG. 2, or can be external to the telephone system 110 and interfaced through an appropriate serial or parallel interface on the Emergency Alert System radio receiver and detector module 122 and the telephone system 110.

A ring detector 126 is provided to detect a ring signal from the telephone company central office 114, and accordingly causes the controller 118 to ring a ringer 128. According to the principles of the present invention, the ring detector 126 is activated not only by the reception of an ordinary telephone call as in an otherwise conventional telephone, but also by the Emergency Alert System detector and module 122 upon detection of an emergency message broadcast. Alternatively, the ring signal may be provided by the Emergency Alert System detector module 122 directly to the controller 118 without the need for using the ring detector 126.

In particular, the telephone system 210 illustrated in FIG. 2A also includes an Emergency Alert System radio receiver and detector module 218 having an antenna 220. The Emergency Alert System radio receiver and detector module 218 can either be integrated within the telephone system 210, as illustrated in FIG. 2, or can be external to the telephone system 210 and interfaced through an appropriate serial or parallel interface on the Emergency Alert System radio receiver and detector module 218 and the telephone system 210.

As in the embodiment of the present invention illustrated in FIG. 2, a ring detector 220 is connected to a ringer 222 to detect a ring signal from the telephone company central office 114, and accordingly cause the controller 118 to ring a ringer 128. According to the principles of the present invention, the ring detector 126 may alternatively be activated by the Emergency Alert System detector and module 122 upon detection of an emergency message broadcast.

Emergency Alert System warning broadcasts typically include both analog and digital information. The analog portion of the information can be input directly into the voice recorder/playback module 18 for recording. However, alternative or additional use of the digital portion of the Emergency Alert System warning message may be implemented. For instance, the digital portion of the information may be stored and displayed on a suitable LCD or similar alphanumeric display device visible to the user. Alternatively, or additionally, the digital portion of the information may be converted from a digital signal together with a voice synthesizer into an analog signal with a suitable digital-to-analog converter of, e.g., a CODEC for recordal and/or playback by the voice recorder/playback module of the telephone answering device 10. Moreover, the digital portion of the information can be recorded substantially in the same form as received into a digital voice message memory, e.g., with a digital telephone answering device.

Figure 3:
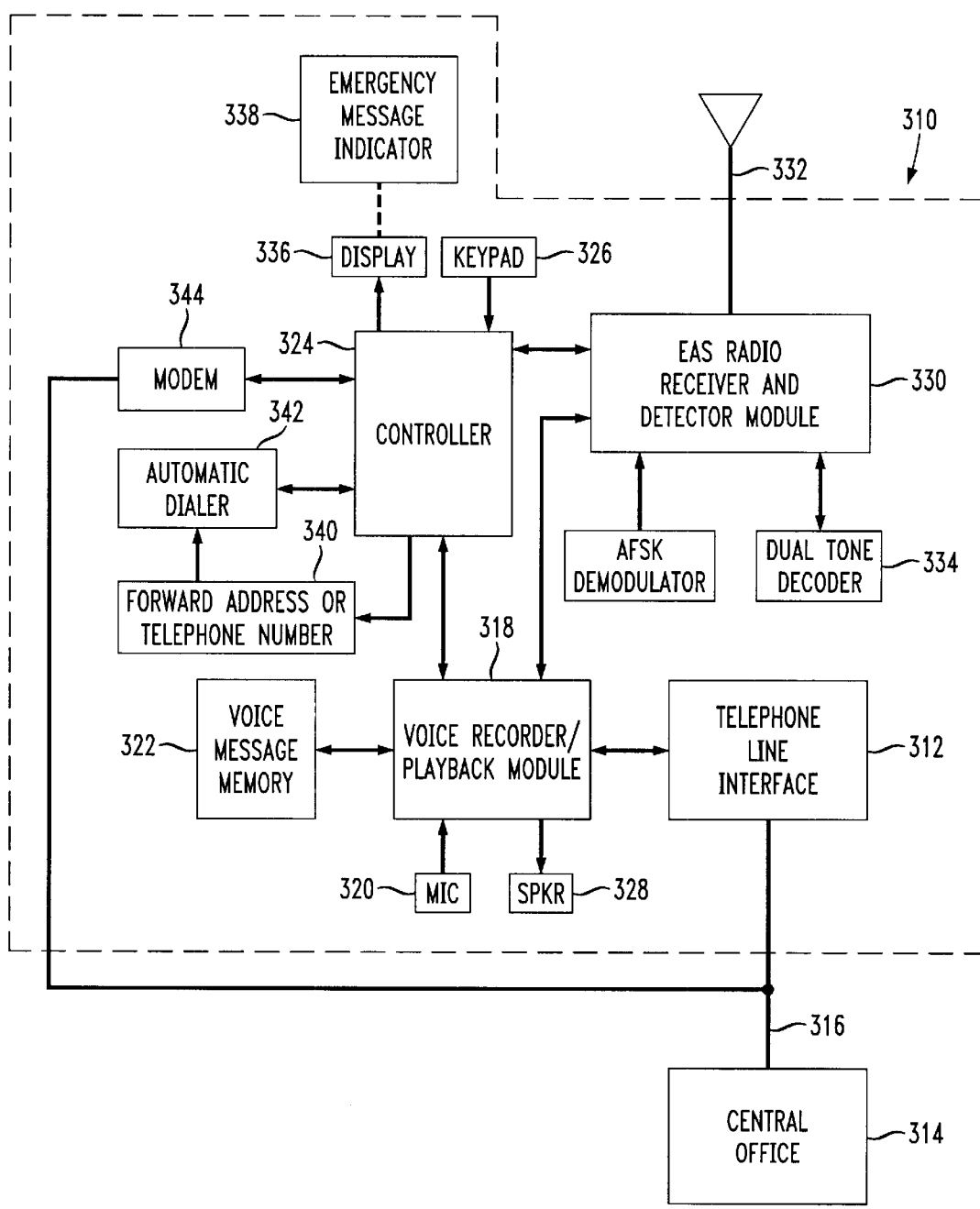
FIG. 3 illustrates yet another embodiment of a telephone answering device which receives and records Emergency Alert System warnings and forwards the Emergency Alert System warning message to a desired third location, in accordance with the principles of the present invention.

FIG. 3 illustrates a telephone answering device, indicated generally at 310, capable of receiving and recording an Emergency Alert System warning message, in accordance with the principles of the present invention, and forwarding the emergency message to a designated desired location. In this embodiment, an Emergency Alert System warning message is received and recorded as a voice message in a voice message memory, and then at the appropriate time, e.g., either while the emergency message is still being received, or after it is completely received, the telephone answering device 310 will automatically dial a forwarding telephone number, establish a telephone connection, and forward the recorded, received emergency message either in analog or in digital form to a receiving device at the other end of the established telephone connection.

The telephone answering device 310 shown in FIG. 3 also includes at least one telephone line interface 312 for interconnection with a telephone company central office 314 via a telephone line 316. The telephone line interface 312 interconnects the telephone line 316 with a voice recorder/playback module 318.

An Emergency Alert System warning message is recorded in the voice message memory 322 under the control of a controller 324.

The controller 324 controls the overall functions of the telephone answering device 310 and is typically a processor, e.g. a microprocessor, a digital signal processor (DSP), or a microcontroller.

A keypad 326 allows the user to select any of various modes of operation, including the playback of voice messages, e.g., a recorded Emergency Alert System warning message, through a speaker 328 connected to the voice recorder/playback module 318.

Importantly, the telephone answering device 310 illustrated in FIG. 3 further includes an Emergency Alert System radio receiver and detector module 330 having an antenna 332. The Emergency Alert System radio receiver and detector module 330 can either be integrated within the telephone answering device 310, as illustrated in FIG. 3, or can be external to the telephone answering device 310 and interfaced through an appropriate serial or parallel interface on the Emergency Alert System radio receiver and detector module 330 and the telephone answering device 310. Furthermore, a dual tone decoder 334 can be provided to detect the 853 Hertz and 960 Hertz dual tone signals indicating an Emergency Alert System broadcast.

A display 336 can be connected to the controller for displaying the various otherwise conventional functions of the telephone answering device 310. Preferably, the display 336 also includes an emergency message indicator 338 such as an LED illuminated when an Emergency Alert System warning message is recorded and not yet retrieved, to indicate to the user that an Emergency Alert System warning message has been recorded. This allows the user to quickly ascertain whether a warning message has been recorded, and to decide whether or not immediate review of the warning message is warranted and/or advised.

A memory location or latch forms a forward address or telephone number directory 340. The forwarding telephone number directory 340 may contain (under the control of the controller 324) any appropriately automatically accessed electronic address, e.g., an e-mail address, a telephone number, a pager number, or a combination of the above.

An automatic dialer 342 is in communication with the controller 324 and/or with the forwarding telephone number 340. The automatic dialer 342 dials the appropriate designated forwarding telephone number, telephone number and e-mail address, etc. of the location designated in the forwarding telephone number directory 340, and then causes the playback of the recorded emergency message to the person who answers the telephone.

For instance, the automatic dialer 342 may automatically dial the telephone number and access code of a text and/or voice pager. In the case of a text pager, the text of the Emergency Alert System warning message may be transmitted to the pager, truncated as necessary to the maximum length allowed by the particular pager system. In the case of a voice pager, the digitized audio portion of the Emergency Alert System warning message may be transmitted and output by the voice pager.

A modem 344 may be connected to the telephone line 316 to provide access to the Internet, e.g., for sending an e-mail containing the emergency warning message.

Figure 4:
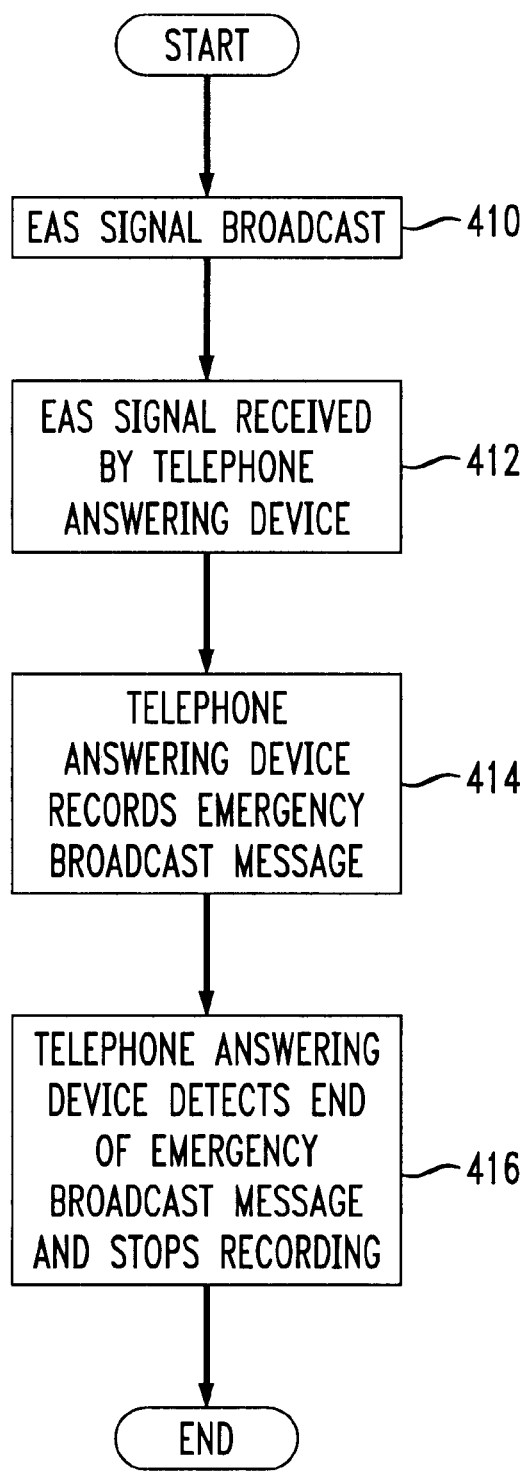
FIG. 4 is a flow chart illustrating a process by which a voice messaging system, e.g., a telephone answering device receives and records Emergency Alert System warnings with the telephone answering device shown in FIG. 1.

An example of the operation of the telephone answering device which receives and records an Emergency Alert System warning message such as that shown in FIG. 1 is shown in FIG. 4.

In particular, with reference to FIG. 4, in step 410, an Emergency Alert System warning message is broadcast.

In step 412, the Emergency Alert System broadcast signal is detected, the telephone answering device 10 is placed in an off-hook or similar condition, and the Emergency Alert System warning message is received by the telephone answering device 10 in accordance with the principles of the present invention.

In step 414, the telephone answering device 10 decodes and records the Emergency Alert System warning message.

In step 416, the telephone answering device 10 detects the end of the Emergency Alert System warning message and stops recording.

Thus, in accordance with the principles of the present invention, a common household device used often (e.g., one or more times every day) such as a telephone answering device can receive and record Emergency Alert System warning message, providing additional assurance that as many persons as possible will receive a particular Emergency Alert System warning message. Moreover, in accordance with the principles of the present invention, a user who was not home at the time that the Emergency Alert System warning message was broadcast can nevertheless receive the information in recorded form.

It is preferred that the Emergency Alert System warning messages stored in a telephone answering device or other voice messaging system be time stamped for use by the user. Moreover, it is also within the principles of the present invention to automatically delete recorded Emergency Alert System warning messages after a significant period of time, e.g., after a day, after two days, etc., particularly if not yet played back by the user. Such automatic deletion may be configurable by the user upon installation of the system.

The principles of the present invention also relate to the telephone company central office. For instance, the central office may include a radio receiver for receiving Emergency Alert System warnings relating to a particular serviced area, and store a copy of the received Emergency Alert System warnings in the voice mailboxes of those users affected by the message.

While the invention has been described with reference to the exemplary embodiments thereof, those skilled in the art will be able to make various modifications to the described embodiments of the invention without departing from the true spirit and scope of the invention.

What is claimed is:

1. A telephone system, comprising:
   an audio recorder playback module;
   an emergency broadcast radio receiver and detector module in communication with said audio recorder playback module;
   a ring detect circuit adapted to be activated by said emergency broadcast radio receiver and detector module upon receipt of a broadcast emergency message; and
   a telephone handset adapted to play said emergency message received by said emergency broadcast radio receiver;
   wherein said audio recorder playback module is adapted to record an emergency message received by said emergency broadcast radio receiver.

2. The telephone system according to claim 1, wherein:
   said emergency message includes an audio portion and a digital portion; and
   said audio recorder playback module is adapted to record said audio portion of said emergency message received by said emergency broadcast radio receiver.

3. The telephone system according to claim 1, wherein:
   said emergency message includes an audio portion and a digital portion;
   said audio recorder playback module includes digital voice memory for storage of said emergency message; and
   said audio recorder playback module is adapted to record said digital portion of said emergency message received by said emergency broadcast radio receiver.

4. The telephone system according to claim 1, further comprising:
   a dual tone decoder in communication with said emergency broadcast radio receiver and detector module.

5. The telephone system according to claim 1, further comprising:
   a display adapted to visually indicate when said audio recorded playback module has recorded said emergency message.

6. The telephone system according to claim 1, further comprising:
   a display adapted to visually indicate an availability of an emergency message being broadcast.

7. The telephone system according to claim 1, further comprising:
   a forwarding address memory adapted to contain a forwarding address as a forwarding destination for said recorded emergency message.

8. The telephone system according to claim 7, further comprising:
   an automatic dialer to automatically access said forwarding address.

9. The telephone system according to claim 7, wherein:
   said forwarding address includes a telephone number.

10. The telephone system according to claim 7, wherein:
    said forwarding address includes a pager telephone number.

11. The telephone system according to claim 7, wherein:
    said forwarding address includes an e-mail address.

12. A telephone system, comprising:
    a telephone handset;
    an audio recorder playback module;
    an emergency broadcast radio receiver and detector module in communication with said audio recorder playback module; and
    a ring detect circuit;
    said emergency broadcast radio receiver and detector module being adapted to activate said ring detect circuit upon receipt of a broadcast emergency message; and
    said telephone handset being adapted to play said emergency message received by said emergency broadcast radio receiver.

13. A method for receiving, recording and playing a broadcast emergency message, comprising:
    receiving an emergency message by a radio receiver;
    recording said emergency message in voice message memory of a telephone system for later retrieval and playback by a user;
    activating a ring detection circuit upon receipt of said emergency message; and
    playing said emergency message through a telephone handset.

14. The method for receiving, recording and playing a broadcast emergency message according to claim 13, further comprising:

indicating to said user that said emergency message has been recorded.

15. The method for receiving, recording and playing a broadcast emergency message according to claim 13, further comprising:

forwarding said recorded emergency message to a predetermined forwarding address.

16. The method for receiving, recording and playing a broadcast emergency message according to claim 13, wherein:

said forwarding address includes a telephone number.

17. The method for receiving, recording and playing a broadcast emergency message according to claim 13, wherein:

said forwarding address includes an e-mail address.

18. Apparatus for receiving, recording and playing a broadcast emergency message, comprising:

radio receiving means for receiving an emergency message;

means for recording said emergency message in voice message memory of a telephone system for later retrieval and playback by a user;

means for activating a ring detection circuit upon receipt of said emergency message; and means for playing said emergency message through a telephone handset.

* * * * *